United States Patent Office 3,111,508
Patented Nov. 19, 1963

3,111,508
PREPARATION OF POLYVINYL ESTERS AND POLYVINYL ALCOHOL
Kiyokazu Imai, Kurashiki City, and Unpei Maeda, Sozya City, Japan, assignors to Kurashiki Rayon Co., Ltd., Okayama, Japan, a corporation of Japan
No Drawing. Filed Oct. 7, 1959, Ser. No. 844,846
Claims priority, application Japan Oct. 14, 1958
4 Claims. (Cl. 260—89.1)

The present invention relates to an improved process for polymerizing vinyl esters such as vinyl acetate. More particularly, the invention is directed to a method for polymerizing vinyl esters in the presence of particular solvents in order to obtain improved polymeric products.

Methods are well-known for the production of polymeric vinyl esters. It is further well-known to prepare polyvinyl alcohol from said polymeric vinyl esters. Such polyvinyl alcohol finds wide utility especially in the form of aqueous solutions thereof.

A significant disadvantage generally found in prior polyvinyl alcohol products is that aqueous solutions thereof tend to gel upon standing. This undesirable tendency to gel adversely affects the utility of such polyvinyl alcohol products.

It is an object of the present invention to provide an improved process for polymerizing vinyl esters.

It is a further object of the invention to provide for the production of polymeric vinyl esters from which improved polyvinyl alcohol can be made.

Other objects will be apparent from the following description of the invention.

In accordance with the present invention, it has been found that vinyl ester monomers can be polymerized in the presence of certain solvents, as specified more completely hereinafter, under solution polymerization conditions to form polymeric vinyl esters having improved characteristics. These polymeric vinyl esters can be converted to polyvinyl alcohol aqueous solutions of which have substantially no tendency to gel even upon prolonged standing.

The solvents used in carrying out this invention are selected from the group consisting of ethylene carbonate and saturated aliphatic nitriles, for example, acetonitrile, propionitrile, butyronitrile, and the like. It has been found that solution polymerization of vinyl esters carried out in the above solvents results in the production of polymer products having superior characteristics.

Vinyl esters which can be polymerized in accordance with this invention include vinyl formate, vinyl acetate, vinyl propionate, vinyl stearate, and the like. In an especially preferred embodiment of the present invention, vinyl acetate is polymerized to form improved polyvinyl acetate.

The solution polymerizations of this invention are carried out employing known polymerization initiators, as well as conventional polymerization temperatures and times. Free radical polymerization intiators as exemplified by benzoyl peroxide, acetyl peroxide, 2,2'-azodiisobutyronitrile are preferably employed in carrying out the invention. Polymerization activation by means of light, e.g. ultraviolet radiation, can be used alone or together with the above polymerization initiators. Polymerization temperatures of the order of 0 to 100° C. are generally suitable although temperatures outside this range can be employed. Polymerization times of the order of several minutes, for example, fifteen minutes to a week or so can be used.

The solvents employed in the polymerization of this invention include ethylene carbonate and saturated aliphatic nitriles. Lower saturated aliphatic nitriles of the formula are

RCN where R is an alkyl radical having 1–4 carbon atoms are especially preferred. With higher saturated aliphatic nitriles, the polyvinyl alcohol produced by the invention tends to have a somewhat lower degree of polymerization.

The amount of solvent used in the polymerization can vary over a wide range. Generally the use of the solvent in amounts of about 15 to 85 parts per 100 parts by weight of the combined monomer and solvent and preferably 20 to 70 parts is suitable.

Polymeric vinyl esters prepared by the invention can be converted into polyvinyl alcohol having improved characteristics by known techniques. Generally, alkaline catalyzed alcoholysis is preferred to prepare such improved polyvinyl alcohol. Lower alcohols such as methanol and ethanol are suitably used in such techniques. Alkaline catalysts such as sodium hydroxide and sodium methylate are advantageously employed.

Product polyvinyl alcohol prepared by the present invention has outstanding and unusual properties. For example, aqueous solutions of said polyvinyl alcohol upon prolonged standing show almost no tendency to gel.

The following examples illustrate the invention.

*Example 1*

A mixture comprising 70 parts by weight vinyl acetate, 30 parts by weight of acetonitrile, and 0.01 part of 2,2'-azodiisobutyronitrile, was prepared. The said mixture was sealed in a tube and maintained at 60° C. for 48 hours. About 47 percent of the vinyl acetate was polymerized to polyvinyl acetate having about 1720 average degree of polymerization.

The product polyvinyl acetate was dissolved in methanol and converted to polyvinyl alcohol by alkaline alcoholysis employing sodium hydroxide catalyst. The polyvinyl alcohol thus obtained had a degree of polymerization of 1630.

A portion of said polyvinyl alcohol was dissolved in water to form an aqueous solution containing 15 percent by weight polyvinyl alcohol. This aqueous polyvinyl alcohol solution upon standing for ten days at 30° C. showed no tendency to gel.

*Example 2*

A mixture comprising 40 parts by weight vinyl acetate, 60 parts of ethylene carbonate, and 0.02 part of 2,2'-azodiisobutyronitrile was prepared. The said mixture was sealed in a tube and polymerized for 3.5 hours at 60° C. About 4.9 percent of the vinyl acetate was polymerized to polyvinyl acetate having an average degree of polymerization of 2530.

The product polyvinyl acetate was dissolved in methanol and converted to polyvinyl alcohol by alkaline catalyzed alcoholysis employing sodium hydroxide catalyst. The said polyvinyl alcohol had an average degree of polymerization of 1720.

The polyvinyl alcohol thus obtained was dissolved in water to form a solution containing 15 percent by weight polyvinyl alcohol. After standing for ten days at 30° C., the said polyvinyl alcohol solution showed no evidence of gel formation.

We claim:

1. A process for preparing polyvinyl acetate which is convertible by alkaline alcoholysis to polyvinyl alcohol which shows almost no tendency to gel in aqueous solution, which comprises homopolymerizing vinyl acetate in the presence of a free radical initiator and in 15 to 85 parts by weight of a solvent, based on the combined weight of monomer and solvent, selected from the group consisting of ethylene carbonate and saturated lower aliphatic nitriles of the formula

RCN where R is an alkyl radical containing from 1 to 4 carbon atoms.

2. A process for preparing polyvinyl acetate which is convertible by alkaline alcoholysis to polyvinyl alcohol which shows almost no tendency to gel in aqueous solution, which comprises admixing a monomer charge consisting essentially of vinyl acetate with a free radical initiator and a solvent selected from the group consisting of ethylene carbonate and saturated lower aliphatic nitriles of the formula

RCN where R is an alkyl radical containing from 1 to 4 carbon atoms, the amount of solvent ranging from 15 to 85 parts by weight per 100 parts combined weight of vinyl acetate monomer and solvent, and homopolymerizing the vinyl acetate in the resulting solution.

3. A process according to claim 1 in which the solvent is ethylene carbonate.

4. A process according to claim 1 in which the solvent is acetonitrile.

References Cited in the file of this patent

UNITED STATES PATENTS

| | | |
|---|---|---|
| 2,570,200 | Bruson | Oct. 9, 1951 |
| 2,649,426 | Gilbert et al. | Aug. 18, 1953 |
| 2,768,148 | Schildknecht et al. | Oct. 23, 1956 |
| 2,862,916 | Lukman et al. | Dec. 2, 1958 |